May 5, 1964  S. YANDO  3,132,257
VOLTAGE CONTROLLED PIEZOELECTRIC SWITCHING DEVICE
Original Filed March 19, 1959

INVENTOR
STEPHEN YANDO
BY
ATTORNEY

United States Patent Office 3,132,257
Patented May 5, 1964

3,132,257
VOLTAGE CONTROLLED PIEZOELECTRIC SWITCHING DEVICE
Stephen Yando, Huntington, N.Y., assignor to Sylvania Electric Products Inc., a corporation of Delaware
Continuation of application Ser. No. 800,433, Mar. 19, 1959. This application Mar. 5, 1963, Ser. No. 263,681
2 Claims. (Cl. 307—88)

My invention relates to switching devices. This application is a continuation of my copending application Serial No. 800,433, filed March 19, 1959, now abandoned.

Electrical data processing equipments normally employ a plurality of signal lines. Switching devices actuate certain of these lines while deactuating other paths, the switching action of any such device being under the control of one or more incoming control signals.

I have invented a new switching device which responds to first and second incoming pulses supplied to the device in variable time relationship with respect to each other. The switching action of my device is determined in accordance with the time of arrival of either pulse relative to the arrival time of the other pulse.

My device can determine the switching sequence for a large number of signal lines. It employs no moving parts; it is simply constructed; and it functions accurately at high switching speeds.

In accordance with the principles of my invention, I provide an elongated strip of piezoelectric material. A first set of N different electrodes are secured to one surface of the strip at spaced apart locations. Similarly, a second set of N different electrodes are secured to the opposite surface of the strip at corresponding spaced apart locations, whereby each first set electrode is positioned opposite the corresponding second set electrode to form a plurality of N different electrode pairs. The electrode pair adjacent one end of the strip is designated as the first electrode pair; the electrode pair adjacent the other end of the strip is designated as the second electrode pair. Both ends of the strip are terminated in such manner as to absorb, substantially without reflection, any incident elastic wave supplied thereto from the strip.

First and second pulses are applied to the first and second electrode pairs respectively. Each pulse produces an elastic wave which propagates along the strip, the two waves travelling in opposite directions. Each wave is accompanied by an electric field. The two waves intersect at a point along the strip, the position of the point of intersection being determined by the relative timing of the first and second pulses. When he point of intersection coincides with any electrode pair, an output pulse, proportional to the summation of two electric fields, appears at this pair.

Thus, by varying the relative timing of the first and second pulses, an output pulse can be produced at any selected electrode pair. The output pulse can be used to actuate any signal line coupled to this selected pair.

An illustrative embodiment of my invention will now be described with reference to the accompanying drawings wherein—

Figure 1:
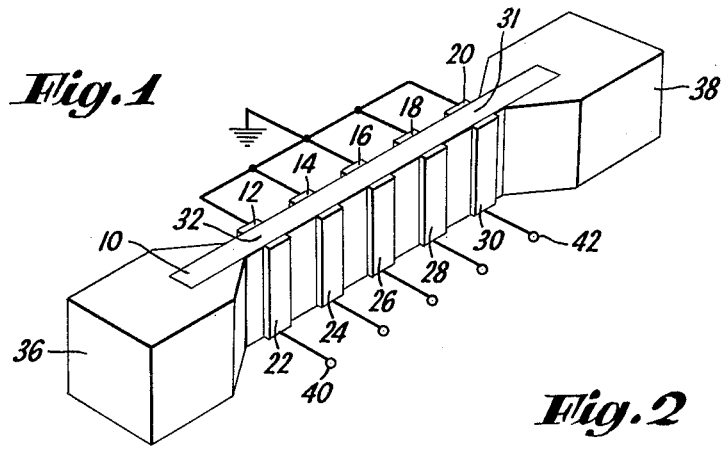
FIG. 1 is an isometric view of the elongated piezoelectric strip and the associated electrodes.

Referring now to FIG. 1, there is shown a thin strip or ribbon 10 of piezoelectric material; in this example, the material is a polarized ceramic strip composed of a sintered lead titanate-lead zirconate mixture. A first set of N different electrodes, extending transversely to the long axis of the strip, are secured to one surface of strip 10 at equidistantly spaced positions. In this example, the first set is constituted by electrodes 12, 14, 16, 18 and 20. A second and like set of electrodes 22, 24, 26, 28 and 30 are secured to the opposite surface of strip 10, each second set electrode being positioned opposite the corresponding first set electrode to form an electrode pair.

Electrodes 12 and 22, adjacent the left end of strip 10 form a first electrode pair and subtend a first section 32 of strip 10. Similarly, electrodes 20 and 30 form a second electrode pair and subtend a second section 31 of strip 10.

Each end of the strip is terminated in such manner as to absorb substantially without reflection, any incident elastic wave propagating in said strip. This is accomplished by coating the ends and immediately adjacent portions of strip 10 with a material, such as lead, to provide terminations 36 and 38.

Electrodes 12, 14, 16, 18 and 20 are grounded. Electrode 22 is coupled to a first input terminal 40. Electrode 30 is coupled to a second input terminal 42.

First and second incoming voltage pulses having equal magnitudes are applied between electrodes 12 and 22 and electrodes 20 and 30, respectively. Each pulse establishes a corresponding electric field within appropriate ones of sections 32 and 31. The electric field intensity is proportional to the instantaneous value of the appropriate voltage pulse.

Due to the piezoelectric characteristics of strip 10, each electric field produces, in the corresponding sections 32 and 31, a mechanical strain proportional to the instantaneous field intensity. Hence, this strain is proportional to the instantaneous value of the appropriate incoming pulse. The strain produces a disturbance which is proportional to the time rate of change of the strain and, consequently, is also proportional to the first time derivative of the pulse. This disturbance propagates along the strip in the form of oppositely directed elastic waves travelling toward the right hand and left hand respectively of strip 10.

More particularly, the first pulse produces a first elastic wave which travel from section 32 toward the right hand end of the strip. (The first pulse also produces an oppositely directed wave which is absorbed almost immediately in termination 36 and has no influence upon the operation of my device.) The second pulse produces a second elastic wave which travels from section 31 toward the left hand end of the strip. (The second pulse also produces an oppositely directed wave which is absorbed in termination 38.)

Each of the first and second waves, due to the piezoelectric effect, is accompanied by an electric field, the intensity of which is proportional to the first time derivative of the appropriate pulse and has a voltage value V. The intensities of both fields are additive at the point of intersection of the first and second waves. The timing of the pulses is so chosen that this point of intersection will be coincident with a selected electrode pair. Due to the piezoelectric effect, an output pulse will be produced across this electrode pair. Since the output pulse amplitude is proportional to the summation of the electric fields, the level of this amplitude is 2V. (Each of the first and second travelling electric fields has a voltage level V. However, the effects of the separate fields can be ignored since any data transmission line coupled to any electrode pair can be designed to be actuated at a minimum threshold voltage of 2V.)

When the first and second voltage pulses arrive in time synchronism at the corresponding contact pairs, the point of intersection of the first and second waves will be positioned at the midpoint of strip 10. The electrode pair constituted by electrodes 26 and 16 is positioned at the midpoint. Consequently, the output pulse will appear across this electrode pair. When the first pulse leads the second pulse, the point of intersection will be displaced to the right of the midpoint. By appropriately adjusting the lead time, the output pulse can then appear at electrode pair 18, 28. When the second pulse leads the first pulse, the point of intersection will be displaced to the left of the midpoint. Again, by adjusting the time interval, the output pulse can be produced at electrode pair 14 and 24.

More particularly, the time interval required for the elastic wave to traverse the region of strip 10 between electrodes 12, 22 and electrodes 20, 30 is normally some constant K. When substantially identical first and second pulses are supplied to the corresponding electrode pairs at the same time $t_0$, the corresponding first and second waves will intersect at the midpoint of strip 10 at time $t_0+K/2$, and an output pulse will appear at the electrode pair 16, 26. When the second pulse is supplied at time $t_0$, while the first pulse is supplied at time $t_0+K/2$, the waves will intersect at time $t_0+3K/4$, the point of intersection will coincide with electrode pair 14, 24, and the output pulse will appear thereat. On the other hand, when the second pulse is supplied at time $t_0$, while the first pulse is supplied at time $t_0-K/2$, the waves will intersect at time $t_0+K/4$, the point of intersection will coincide with electrode pair 18, 28 and the output pulse will appear at this electrode pair. Thus, the point of intersection can be produced in any horizontal position along strip 10.

Further, this point of intersection can be moved in any desired pattern, as for example, in successive positions from the extreme left to the extreme right of strip 10. When these successive positions coincide with successively positioned electrode pairs, an output pulse will appear sequentially across each electrode pair in turn.

More particularly, in order to produce this sequence of operation, a first pulse train containing $x$ separate first pulses (where $x$ is the number of different electrode pairs other than the first and second pairs) is applied between contacts 12 and 22. The first pulses are generated at a fixed recurrence frequency; i.e. these first pulses are equidistantly spaced in time. A second pulse train also containing $x$ separate second voltage pulses is applied between contacts 20 and 30. The relative timing of each N$th$ pulse in the second train (where N is any integer from 1 to $x$) with respect to the corresponding N$th$ pulse in the first train must be smoothly varied from $+K$ to $-K$. More particularly, the switching action is initiated when the first pulse in the first train lags the first pulse in the second train by K and is completed when the last pulse in the second train lags the last pulse in the first train by K.

Figure 2:
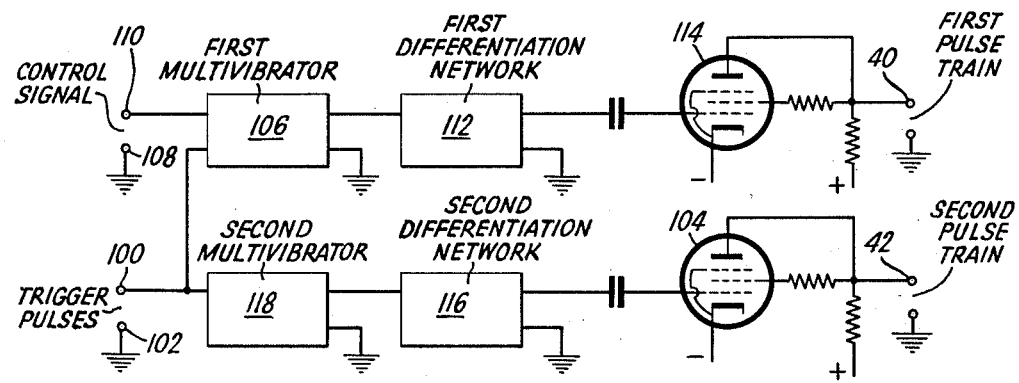
FIG. 2 is a block diagram of an electronic system wherein the relative timing of the first and second incoming pulses can be varied as required.

A block diagram of circuitry for accomplishing the above described switching action is shown in FIG. 2. (The circuitry designated by each block in this diagram is conventional and will not be shown here.)

Figure 3:
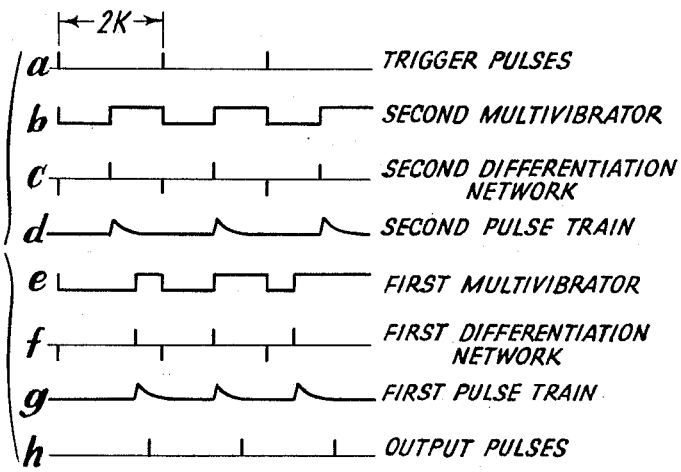
FIGS. 3a–3h show the waveforms of signals utilized in the system of FIG. 2.

A train of $x$ separate positive trigger pulses (in this example $x$ is three), is applied between terminals 100 and 102. The trigger pulses are equidistantly spaced (FIG. 3a). (The minimum time spacing between adjacent trigger pulses is slightly greater than 2K or, in other words, the recurrence frequency is slightly less than ½K. At higher recurrence frequencies, spurious switching signals can be produced. The trigger pulses are supplied to the input of a second multivibrator 118. Upon the arrival of each trigger pulse, the second multivibrator produces a rectangular shaped pulse (FIG. 3b) having a fixed period of 2K. This rectangular pulse of fixed period or width is then differentiated in a second differentiation network 116 to produce alternative positive and negative pulses (FIG. 3c). These differentiated pulses are supplied to the input of pentode tube 104. Tube 104 is biased to pass only positive pulses. As a result, the second pulse train is produced and appears at terminal 42 (FIG. 3d). It will be noted that the pulses in the second train have a sawtooth wave form; the combination of the capacitor formed by the electrode 20, strip section 31 and electrode 30, and the plate resistor of tube 104 acts upon the pulses passing through this tube to change the waveform from a spike to a sawtooth.

(It is often desired that the output signal produced across any electrode pair have a spike-like waveform. Due to the differentiating action of the strip 10, the pulses in both of the first and second trains must have a sawtooth waveform to provide this desired output signal waveform.)

Further, the trigger pulses are supplied to the input of the multivibrator 106. Upon the arrival of each trigger pulse, the multivibrator produces a rectangular shaped pulse (FIG. 3e) having a period which decreases from 2K to almost 0 with a control signal applied between terminals 108 and 110. The control signal can be a direct voltage which increases positively from 0, the period decreasing as the direct voltage increases. (If the number of electrode pairs is sufficiently large, the control signal can be a sawtooth wave decreasing from a positive maximum value to 0 and having a period of $2xK$ where $x$ and K have been previously defined.)

The rectangular pulse of variable width or period is then differentiated in differentiation network 112 to produce alternative positive and negative pulses (FIG. 3f). The differentiated pulses are then supplied to the input of pentode tube 114. Tube 114 is biased to pass only the positive pulses. Tube 114 converts the positive pulses to sawtooth pulses in the same manner as tube 104. Consequently, the pulses appearing at the output of tube 114 and supplied to terminal 40 constitute the first pulse train of sawtooth pulses (FIG. 3g).

Hence, the time spacing between corresponding pulses in the first and second pulse trains is variable.

As a consequence, the point of intersection of the elastic waves is shifted, and the output pulses (FIG. 3h) appear successively across each of electrode pairs (14, 24), (16, 26) and (18, 28) in turn.

More particularly, the first output pulse of 2V in FIG. 3h delayed by $3K/4$ with respect to the first pulse in the second train appears across electrode pair 14, 24. The second output pulse, delayed by $K/2$ with respect to the second pulse in the second train appears across electrode pair 16, 26. The third output pulse delayed by $K/4$ with regard to the third pulse in the second train appears across electrode pair 18, 28.

It will be apparent that when electrodes 12, 14, 16, 18 and 20 are all connected to a common potential point such as ground, these electrodes can be replaced by a single common electrode.

As many changes could be made in the above construction and many different embodiments could be made without departing from the scope thereof, it is intended that all matter contained in the above description or shown in the accompanying drawings shall be interpreted as illustrative and not in a limiting sense.

What is claimed is:
1. A voltage controlled piezoelectric device comprising
   (a) an elongated strip of piezoelectric material,
   (b) first and second pairs of input electrodes attached to said piezoelectric strip, the electrodes of said first pair being attached to opposite surfaces of said piezoelectric strip adjacent one end thereof and the electrodes of said second pair being attached to opposite surfaces of said piezoelectric strip adjacent the other end thereof,
   (c) a plurality of N pairs of output electrodes, where N is any integer, attached to said piezoelectric strip between said first and second pairs of input electrodes, the even-numbered electrodes being secured to one surface of said strip at spaced apart locations and the odd-numbered electrodes being secured to the other surface of said strip opposite said even-numbered electrodes at corresponding spaced apart locations,
(d) first and second terminations affixed to opposite ends of said strip, said terminations absorbing substantially without reflection any incident acoustical energy supplied thereto from said strip,
(e) first and second sawtooth voltage generators coupled between said first and second pairs of input electrodes respectively, the sawtooth voltages produced by said voltage generators propagating elastic waves accompanied by electric fields along said strip,
(f) first and second multivibrators, said first multivibrator being responsive to an applied control signal and said second multivibrator being responsive to said applied control signal and to applied trigger pulses, and
(g) first and second differentiation networks coupled between the outputs of said first and second multivibrators and the inputs of said first and second sawtooth voltage generators, said elastic waves intersecting at a selected one of said pairs of output electrodes in accordance with the magnitude of said applied control signal, the voltage across said selected pair of output electrodes being proportional to the sum of the time derivatives of said sawtooth voltages.

2. The voltage controlled piezoelectric device defined by claim 1 wherein the input and output electrodes secured to the same surface of said piezoelectric strip are connected to a common reference point.

References Cited in the file of this patent
UNITED STATES PATENTS
2,941,110   Yando _____ June 14, 1960
FOREIGN PATENTS
627,057   Great Britain _____ July 1949